(12) United States Patent
Lybbert (10) Patent No.: US 7,538,522 B2
(45) Date of Patent: May 26, 2009

(54) SPECIALLY IMPROVED AUTOMOTIVE REPLACEMENT VOLTAGE REGULATOR

(75) Inventor: Justin B. Lybbert, Fishers, IN (US)

(73) Assignee: Taditel US, Inc, Anderson, IN (US)

( * ) Notice: Subject to any disclaimer, the term of this patent is extended or adjusted under 35 U.S.C. 154(b) by 0 days.

(21) Appl. No.: 12/150,389

(22) Filed: Apr. 29, 2008

(65) Prior Publication Data

US 2008/0265845 A1  Oct. 30, 2008

Related U.S. Application Data

(60) Provisional application No. 60/926,931, filed on Apr. 30, 2007.

(51) Int. Cl.
*H02J 7/14* (2006.01)
(52) U.S. Cl. .............................. 322/28; 322/24; 322/33; 322/37
(58) Field of Classification Search .................. 322/24, 322/28, 33, 37
See application file for complete search history.

(56) References Cited

U.S. PATENT DOCUMENTS

| | | |
|---|---|---|
| 4,459,489 A | 7/1984 | Kirk et al. |
| 4,470,003 A | 9/1984 | Mitchell |
| 4,636,706 A | 1/1987 | Bowman et al. |
| 4,733,159 A | 3/1988 | Edwards et al. |
| 5,565,760 A * | 10/1996 | Ball et al. ...................... 322/23 |
| 6,157,175 A * | 12/2000 | Morinigo et al. .............. 322/28 |
| 7,064,525 B2 | 6/2006 | Pachciarz et al. |
| 7,285,938 B2 * | 10/2007 | Aoyama ...................... 322/28 |
| 2008/0054856 A1 | 3/2008 | Lybbert |

* cited by examiner

*Primary Examiner*—Nicholas Ponomarenko
*Assistant Examiner*—Iraj A Mohandesi
(74) *Attorney, Agent, or Firm*—John D. Ritchison; Ritchison Law Office (57) ABSTRACT

This device is A Specially Improved Automotive Replacement Voltage Regulator for use in the automotive components remanufacturing and original equipment alternator product. Particularly this device has additional transient suppression means for the loads; "high side drive" of the rotor field to eliminate corrosion from the low side short condition; full passivation around the monolithic chip; and a monolithic chip that contains both the power and control devices which permits a simplified heat sink for thermal dissipation.

11 Claims, 9 Drawing Sheets

SPECIALLY IMPROVED AUTOMOTIVE REPLACEMENT VOLTAGE REGULATOR

CROSS-REFERENCE TO RELATED APPLICATIONS

This application claims the benefit of Provisional Patent Application Ser. No. 60/926,931 filed Apr. 30, 2007 by Justin Lybbert, and entitled "Specially Improved Automotive Replacement Voltage Regulator".

FIELD OF INVENTION

This invention relates to a Specially Improved Automotive Replacement Voltage Regulator for use in the automotive components re-manufacturing and original equipment alternator product. Particularly this new Specially Improved Automotive Replacement Voltage Regulator is related to devices and methods to improve the electrical connections, to use high side rotor current drives, to prevent failures related to poor connections and heat variations, and to eliminate failures from transient voltage surges (spikes) that effect electronic devices such as the voltage regulator. This Specially Improved Automotive Replacement Voltage Regulator may be featured as an improved replacement regulator in the automotive electrical components re-manufacturing industry. It may also be featured with the original equipment, if approved by the vehicle makers, as a manner to improve the quality and durability of the alternator voltage control.

FEDERALLY SPONSORED RESEARCH

None.

SEQUENCE LISTING OR PROGRAM

None.

BACKGROUND—FIELD OF INVENTION AND PRIOR ART

The Specially Improved Automotive Replacement Voltage Regulator device is made with improved configuration of physical connections, of a durable design, and with better electrical transient and surge protection as compared to other currently utilized voltage regulators. Likewise, by using a "high side drive" to the rotor coil from the Specially Improved Automotive Replacement Voltage Regulator, corrosion is reduced. This anti-corrosion effect is because even in the event of a rotor short, the regulator will not permit current to the coil as in a "low-side" drive configuration.

A. Introduction of the Problem Addressed

The charging system in vehicles has always faced tough environmental and system conditions. Harsh corrosion from road water, salt, and mud; high vibration from rough roadways; and, high temperatures from under hood insulation increased electrical loads requiring higher outputs by the alternator, thus increasing the ambient temperatures the unit, including the regulator, is exposed to in operation. This new Specially Improved Automotive Replacement Voltage Regulator is related to devices and methods to improve the electrical connections, to use high side rotor current drives, to prevent failures related to poor connections and heat variations, and to eliminate failures from transient voltage surges (spikes) that effect electronic devices such as the voltage regulator. In past remanufacturing, fasteners were not reconnected and torqued and tightened properly. And, less than optimum materials for replacement were used. All these environmental and processing concerns effected the quality and durability of the regulators and ultimately resulted in shorter life and early failures to remanufactured alternators.

B. Prior Art

In recent years, some regulators have attempted to address these problems and shortfalls. Examples of prior replacement and original equipment (OE) regulators begin with U.S. Pat. No. 4,459,489 issued to Kirk, et al. (1984). This teaches a Generator load response control for regulating voltage in a system where a generator supplies the battery and electrical loads on a motor vehicle. This early system included a load response control for detecting whenever a substantial electrical load is applied to the generator tending to cause a drop in generator output voltage and when such a condition is detected field current is controlled to gradually increase field current from some value. The mechanical interface had limitations as described above for the remanufacturing and had limited transient protection. Another very specific regulator was issued to Edwards, et al as U.S. Pat. No. 4,733,159 (1988). It taught a Charge pump voltage regulator. Here the voltage regulator provides a pulse width modulated voltage regulator output to a drive circuit to provide field coil excitation for a voltage generator. This provided a charging signal for a battery. The voltage regulator output determined the on/off states of an FET power switching device coupled in series with a field coil across a maximum power source voltage potential corresponding to battery voltage. This device again offered little robustness or transient protection as taught by the new Specially Improved Automotive Replacement Voltage Regulator A U.S. Pat. No. 4,470,003 issued to Mitchell (1984) taught a voltage regulator with temperature responsive circuitry for reducing alternator output current. Here a conventional voltage regulator was modified to reduce the power output from an associated alternator type generator by lowering the field current duty cycle when the ambient temperature at the voltage regulator exceeds a predetermined critical value, to thereby prevent damage to the alternator and regulator components until the ambient temperature is reduced. A temperature responsive means is connected across the field winding of the alternator and provides an override control function to the regulating section of the regulator, whenever the ambient temperature is too high. The override control causes the closed field current switch to be opened and to be held opened for a period of time that is directly related to the value of the sensed ambient temperature above the critical value. While this control helps with temperature, it has no stated features to help with electrical and mechanical improvements of the improved Lybbert device. Other examples of rack or storage devices include a U.S. Pat. No. 4,636,706 issued to Bowman, et al. (1995) which taught a Generator voltage regulating system. Here the improvement was a voltage regulator for regulating the output voltage of a diode-rectified alternating current generator that supplies the electrical loads on a motor vehicle including the storage battery. The voltage regulator has an up-down counter which is incremented when the output voltage of the generator is below a desired regulated value and is decremented when the output voltage of the generator is above the desired regulating value. The system was capable of sensing either battery voltage or rectifier output voltage and was controlled to automatically switch between battery voltage and rectifier voltage under certain operating conditions. The device did not feature the enhancements shown in the Specially Improved Automotive Replacement Voltage Regulator.

Method for improved battery state of charge was shown in U.S. Pat. No. 7,064,525 issued to Pachciarz, et al. (2006). This showed a method for improving vehicle battery state-of-charge (SOC) for initial vehicle customer delivery. The method is focused on vehicle assembly plant practices and ensuring that battery discharge is minimized or eliminated during the vehicle assembly process. The method includes determining the available maximum percentage of duty cycle voltage output from the vehicle alternator and determining a minimum idle boost speed necessary to provide minimum discharge or positive charge to the battery when the vehicle's accessories are in the "on" state during vehicle assembly. The method further includes programming the vehicle's controllers to force the maximum percentage of duty cycle voltage output available and the minimum idle speed necessary to provide minimum battery discharge or positive charge during the earliest part of the vehicle life. This does not teach the Lybbert improvements.

Another Lybbert device is an Improved Automotive All Silicon Voltage Regulator (I-ASVR) for use in the automotive components re-manufacturing and original equipment alternator product. It is application Ser. No. 11/823972 filed Jun. 28, 2007 and published as US Patent Application 20080054856 A1 on Mar. 6, 2008. Particularly this device improves the electrical connections, prevents failures related to poor connections and heat variations, and eliminates failures from transient voltage surges that effect electronic devices. The device is comprised essentially of four significant changes to a standard voltage regulator: an addition to the electronics of a transient suppression means for the loads; a connection for the battery connection (B+) through a fixed terminal that connects and is sandwiched under the battery stud of the rectifier bridge; the elimination of the soldered B+terminal that was susceptible to corrosion and failure; and, an improved grounding connection. This application does not teach the Lybbert improvements shown by the Specially Improved Automotive Replacement Voltage Regulator.

As far as known, there are no other Automotive Voltage Regulator devices at the present time which fully provide these improvements to the voltage regulator as the present Specially Improved Automotive Replacement Voltage Regulator. The configuration of the physical connections, of a durable design, and with better electrical transient and surge protection are significant improvements as compared to other currently utilized voltage regulators.

SUMMARY OF THE INVENTION

A Specially Improved Automotive Replacement Voltage Regulator has been developed for use with an automotive alternator in the automotive electrical component remanufacturing industry. The device may also be used for an improved original equipment (OE) voltage regulator. It is important to note that this is a replacement in the Taditel T-Series as direct replacement for 2G and 3G original equipment regulators. Many variations of automotive alternators may use the T-series with minor physical changes for mounting.

In the vehicle during operation the alternator is exposed to severe vibration, heat and corrosive materials such as road salt, moisture, and the like. During operation there may be intermittent loads such as windshield wiper motors, window actuator motors and the like that may cause transient surges. Also, in the re-manufacturing operation, the voltage regulator may be exposed to high transient voltage surges (spikes) during disassembly, reassembly and testing. The Specially Improved Automotive Replacement Voltage Regulator device provides an economical, efficient, and durable way to improve the performance and durability of a voltage regulator.

The preferred embodiment of the Specially Improved Automotive Replacement Voltage Regulator device is comprised of significant changes to a standard voltage regulator: The first improved change is an addition to the electronics of a transient suppression means for the loads. The second improved change is the presence of the "high side drive" of the rotor field which eliminates corrosion from the low side short condition. A third change is full passivation around the monolithic chip with the electronic control and power devices and the transient protection. And, a fourth change is utilizing standard, higher volume electronics monolithic chip that contains both the power and control devices and permits a simplified heat sink for thermal dissipation.

The Specially Improved Automotive Replacement Voltage Regulator device is configured to aid in fast re-build in the re-assembly process. In operation, the new device may be easily and quickly affixed to the slip ring end casting and connected to the brush with simple tools.

OBJECTS AND ADVANTAGES

There are several objects and advantages of the Specially Improved Automotive Replacement Voltage Regulator device. There are currently no known voltage regulator devices that are effective at providing the objects of this invention.

The following TABLE A summarizes various advantages and objects of the Specially Improved Automotive Replacement Voltage Regulator device. This list is exemplary and not limiting to the many advantages offered by this new device.

TABLE A

Various Advantages and Objects

| Item | Description of Advantage and Object |
| --- | --- |
| 1 | Simple assembly to the Slip Ring End casting and brush with simple hand tools or powered fastener drivers for mounting and electrical connections. |
| 2 | Elimination of the Rotor corrosion problem associated with the OE low side drive design that affects the alternators operation. |
| 3 | Monolithic chip with all power and control mounted |
| 4 | Same robustness as the Taditel CS T-Series regulators. |
| 5 | Manufactured with OE materials. |
| 6 | Sealed regulator and passivated electronics for more robustness to harsh environments. |
| 7 | High side drive to field coil of rotor |
| 8 | External Transient suppression |
| 9 | Elimination of many wire bonds present in the OE design |

Finally, other advantages and additional features of the present Specially Improved Automotive Replacement Voltage Regulator device will be more apparent from the accompanying drawings and from the full description of the device. For one skilled in the art of devices and improvements for electronic voltage regulators, it is readily understood that the features shown in the examples with this mechanism are readily adapted for improvement to other types of voltage regulation devices and systems.

DESCRIPTION OF THE DRAWINGS—FIGURES

The accompanying drawings, which are incorporated in and constitute a part of this specification, illustrate a preferred and alternative embodiments for the Specially Improved Automotive Replacement Voltage Regulator device. The drawings together with the summary description given above and a detailed description given below serve to explain the principles of the Specially Improved Automotive Replacement Voltage Regulator. It is understood, however, that the device is not limited to only the precise arrangements and instrumentalities shown.

DESCRIPTION OF THE
DRAWINGS—REFERENCE NUMERALS

The following list refers to the drawings:

| Ref # | Description |
| --- | --- |
| 31 | Specially Improved Automotive Replacement Voltage Regulator for replacement applications 3G |
| 31A | Alternative embodiment of the Specially Improved Automotive Replacement Voltage Regulator for replacement applications 2G |
| 31B | Heat sink side of the Specially Improved Automotive Replacement Voltage Regulator |
| 31C | Void in Casting Assembly with Regulator removed (Brush visible) |
| 32 | Specially Improved Automotive Replacement Voltage Regulator in a casting mount |
| 33 | Slip Ring End (SRE) casting |
| 34 | B+ terminal |
| 35 | Phase tracking terminal "S" |
| 36 | F + or Rotor Field Coil Terminal |
| 36A | High side fastening means to connect F+ terminal of regulator to brush assembly |
| 37 | Ground system |
| 37A | Ground fastening means to connect regulator to brush assembly |
| 38 | Heat Sink |
| 39 | Secure yet removable protrusion on enclosure 40 for locking to a harness (not shown) |
| 40 | Enclosure around connection terminals to mate with the Electrical wiring harness of the vehicle |
| 40B | B+ terminal connection "A" |
| 40C | Ignition Terminal "I" |

-continued

| Ref # | Description |
| --- | --- |
| 40D | Phase signal Harness connections "S" |
| 41 | Electrical diagram or schematic |
| 42 | General "KEY" parameters for the Improved Regulator |
| 43 | Voltage Compensation Graph for temperature changes |
| 44 | Rectifier bridge |
| 45 | Stator |
| 46 | Loads to system |
| 47 | Battery |
| 48 | Starter |
| 49 | Key Switch |
| 50 | Fault Lamp |
| 52 | Microprocessor chip |
| 52A | Control Chip |
| 52B | Power chip |
| 53 | Circuit Board for Regulator 31 |
| 54 | Passivation material (a/k/a "sheep snot") |
| 55 | Circuit Board Cover |
| 59 | Original Equipment Voltage regulator |
| 64 | Testing requirements sheet to describe some of the methods to test this new voltage regulator product |
| 65 | Voltage Regulator sales circular |
| 66 | Field Coil |
| 67 | Slip ring |
| 68 | Slip Ring end bearing |
| 69 | Bearing cover |
| PB | Positive Brush (to high side) |
| NB | Negative Brush (to ground of casting) |
| TS | Means for Transient Suppression |

Detailed Description of Preferred Embodiment

The present mechanism is a Specially Improved Automotive Replacement Voltage Regulator 31 that has been developed for use in the aftermarket for rebuilding automotive alternators. The preferred embodiment of the improved device 31 is comprised of changes in electrical transient protection TS and physical improvements to the configuration and mounting means for the voltage regulator device 31. These means are described below in detail.

There is shown in FIGS. 1-9 a complete operative embodiment of the Specially Improved Automotive Replacement Voltage Regulator 31. In the drawings and illustrations, one notes well that the FIGS. 1-9 demonstrate the general configuration and use of this invention. The preferred embodiment of the improved device which replaces Original Equipment 3G and 2G series regulators is comprised of changes in internal electronics, electrical transient protection and other physical improvements to the configuration and mounting means for the voltage regulator device.

The preferred embodiment of the Specially Improved Automotive Replacement Voltage Regulator device 31 is comprised essentially of significant changes to a standard voltage regulator: The first improved change is an addition to the electronics of a transient suppression means TS for the loads 46. The second improved change is the presence of the "high side drive" of the rotor field 66 which eliminates corrosion from the low side short condition. A third change is full passivation (a/k/a sheep snot) 54 around the electronic power and control devices 52 and the transient protection TS. And, a fourth change is utilizing standard, higher volume electronics monolithic chip 52 that contains both the power and control devices and permits a simplified heat sink for thermal dissipation.

The accompanying drawings, which are incorporated in and constitute a part of this specification, illustrate an embodiment of the Specially Improved Automotive Replacement Voltage Regulator 31 that is preferred. The drawings together with the summary description given above and a detailed description given below serve to explain the principles of the Specially Improved Automotive Replacement Voltage Regulator 31. It is understood, however, that the Specially Improved Automotive Replacement Voltage Regulator 31 is not limited to only the precise arrangements and instrumentalities shown.

Figure 1A:
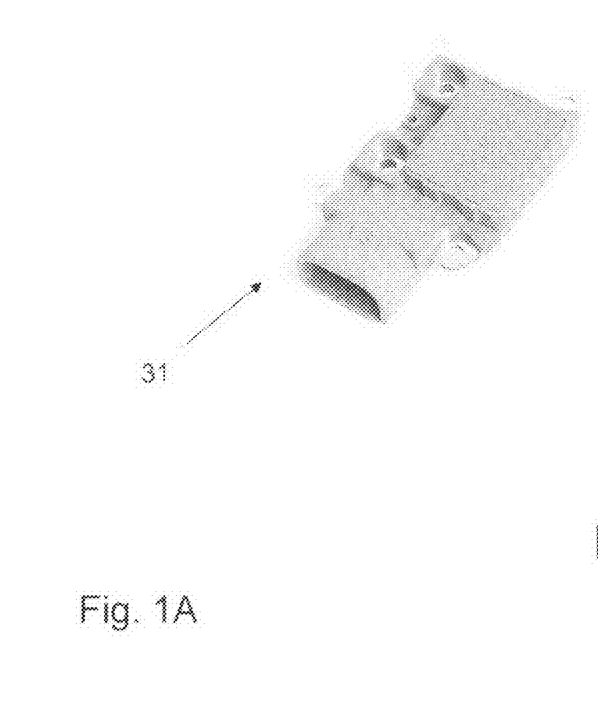
FIGS. 1A and B depict the general Specially Improved Automotive Replacement Voltage Regulator for remanufacturing and potential original equipment applications.
Figure 1B:
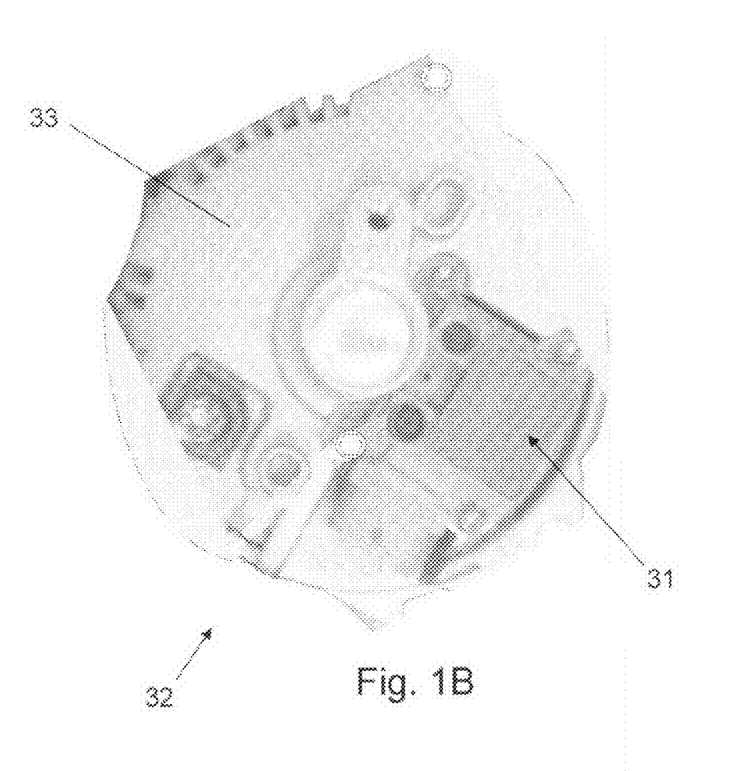

FIGS. 1A and 1B depict the general Specially Improved Automotive Replacement Voltage Regulator 31 for remanufacturing and potential original equipment applications. The general device 31 is shown by itself. Then the device 31 is shown mounted to the Slip Ring End (SRE) Casting 33. In this assembly configuration, the device 31 is part of the SRE assembly 32 comprised of the device 31, a rectifier bridge 44, a casting 33, and a brush holder with positive PB and negative NB brushes (rectifier bridge and brush holder not shown in this view—one may see them in FIGS. 7A through 7C.

Figure 2A:
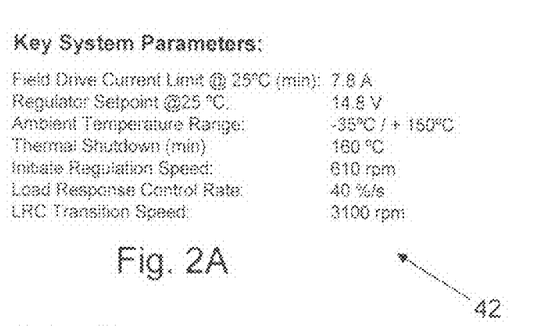
FIGS. 2A through 2D are specifications and electrical schematics for the Specially Improved Automotive Replacement Voltage Regulator.
Figure 2B:
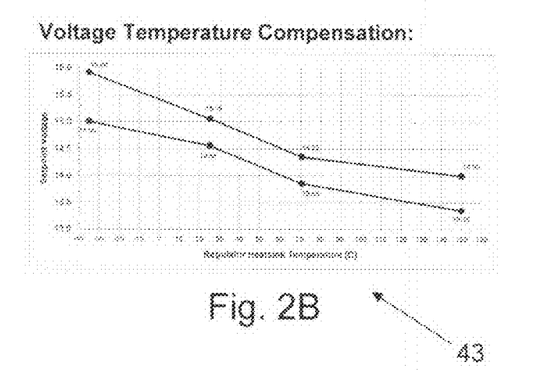
Figure 2C:
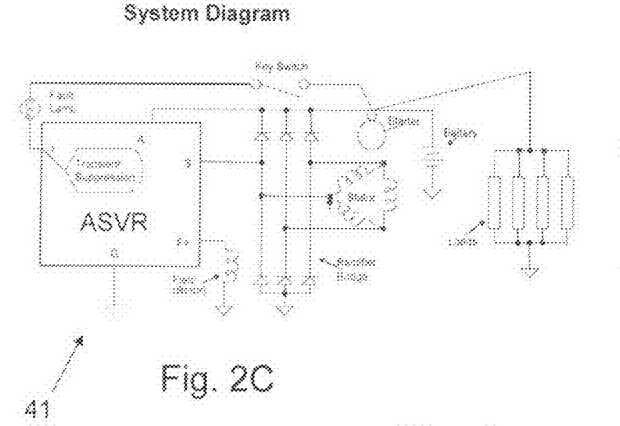
Figure 2D:
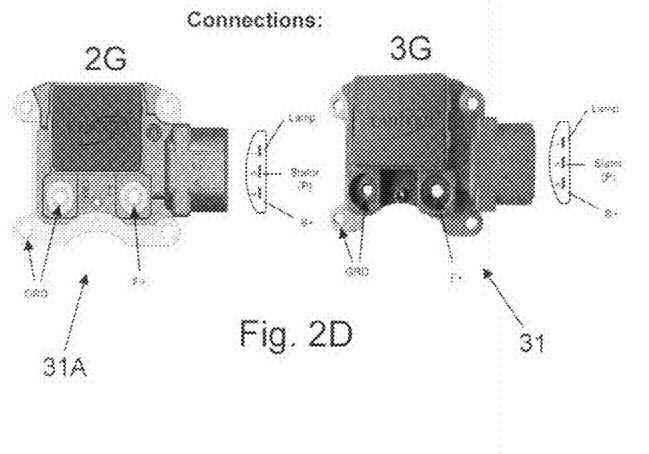

FIGS. 2A through 2D are specifications and electrical schematics for the Specially Improved Automotive Replacement Voltage Regulator 31. FIG. 2A shows the general or key system parameters 42 which are listed for general reference. These parameters are full incorporated into this specification by reference. These parameters are part of the design characteristics provided in the electronic monolithic chip 52 which contains the control and power devices of the packaged device. There is shown in FIG. 2B a graph 43 of the temperature compensation curve for the Specially Improved Automotive Replacement Voltage Regulator 31. In FIG. 2C the general electrical schematic 41 of how the Specially Improved Automotive Replacement Voltage Regulator 31 is placed in the generator electrical system for a vehicle. This is described in detail below. FIG. 2D then shows the Specially Improved Automotive Replacement Voltage Regulator 31 for a 3G replacement and the alternative embodiment 31A which is a 2G replacement regulator with similar design and features. Here is depicted the harness connector 39/40 with the A, S, and I connections, discussed below.

Figure 3:
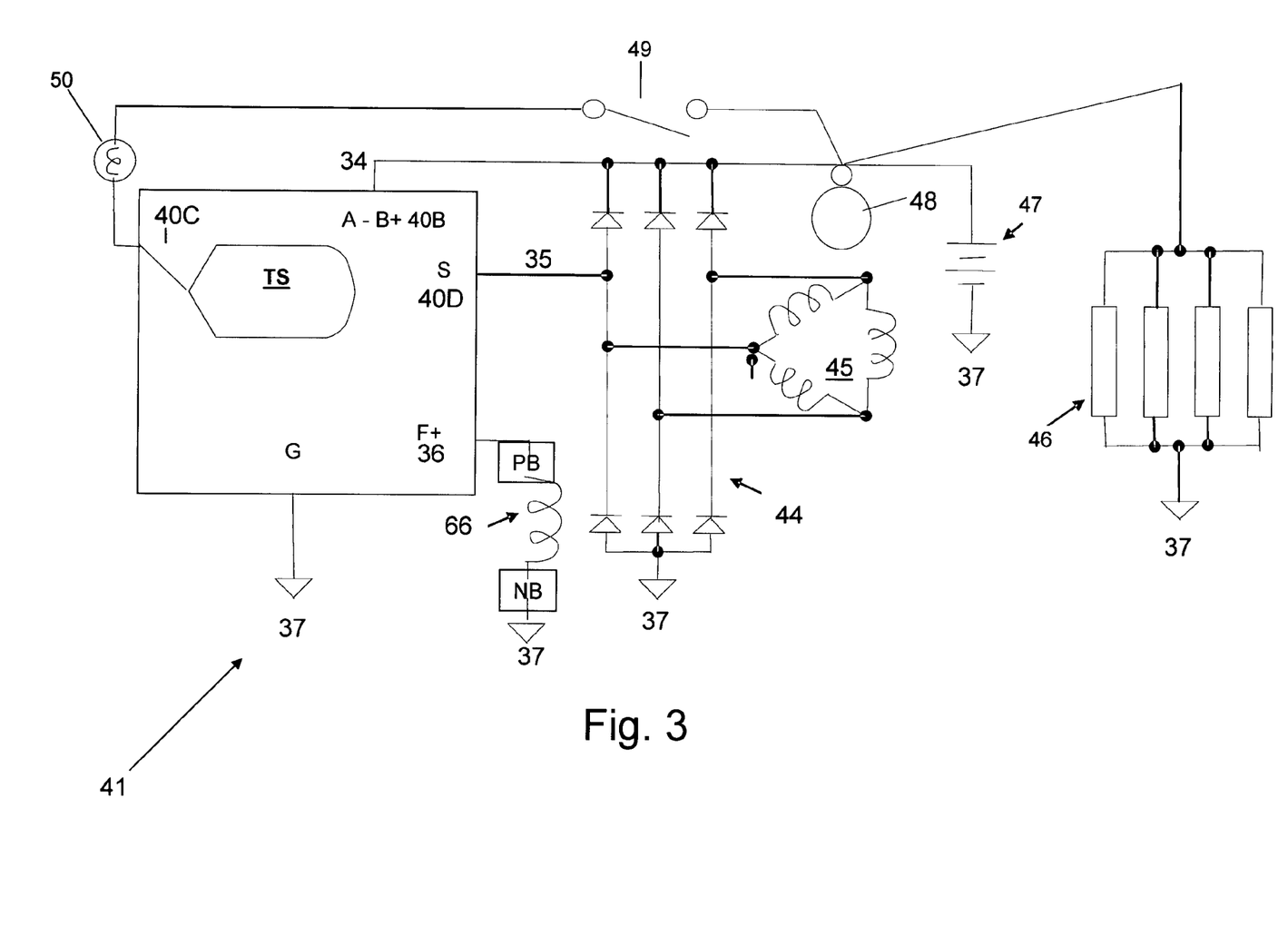
FIG. 3 is the detailed electrical schematics for the Specially Improved Automotive Replacement Voltage Regulator (2G and 3G replacements).

FIG. 3 is the detailed electrical schematic 41 for the Specially Improved Automotive Replacement Voltage Regulator (2G 31A and 3G 31). For one skilled in the art of automotive electrical systems, this is fairly self explanatory. This system is often called the starting, lighting, ignition and battery system (SLI & B) since most of those functions for a automotive or truck vehicle are involved in the electrical system. The system is normally interconnect by a series of wires encased in a harness for ease of installation and for protection of the wires. Significant to the system are the electrical loads 46, connection to the Battery positive (B+) 40B and connection to the starter 48 and battery 47. The latter is normally connected through a key switch 49 commonly call the ignition switch where a person operates the switch with a key. The alternator also has a series of connections from the regulator 31 to the field coil through the F+ terminal 36. The regulator 31 is connected to the rectifier bridge 44 through the B Plus 34 connection described above. The rectifier bridge 44 is likewise connected to the stator 45 by phase tracking wire 35, shown in the drawings. A "S" terminal (Phase wave) 40D also provides control information. One skilled in the art appreciates the importance of all the various ground paths 37 shown from the various components of the electrical system.

A significant improvement to the Specially Improved Automotive Replacement Voltage Regulator 31 is provided by the transient suppression TS. This suppression TS is added to the control chip 52 and circuit board 53 and combined in the electronic configuration. This transient suppression TS feature of the invention anticipates all the types of suppression devices such as, but not limited to, diodes, capacitors, resistors, ferrites, and the plethora of other transient suppressors. The preferred means is incorporated interior to the Specially Improved Automotive Replacement Voltage Regulator 31 package and protected from moisture, dirt and corrosive materials. The electronic combination of the suppressor electronics TS with the circuit board 53 and control chip 52 greatly outperforms limited discrete IC chip devices and other electronic devices that are connected by long leads, wire bonds and susceptible to vibration failure. Likewise the poor prevention or moisture, dirt and corrosive materials (such as road salt) hampers the effect of discrete packaged electronics.

Figures 4A, 4B, 4C, 4D, 4E:
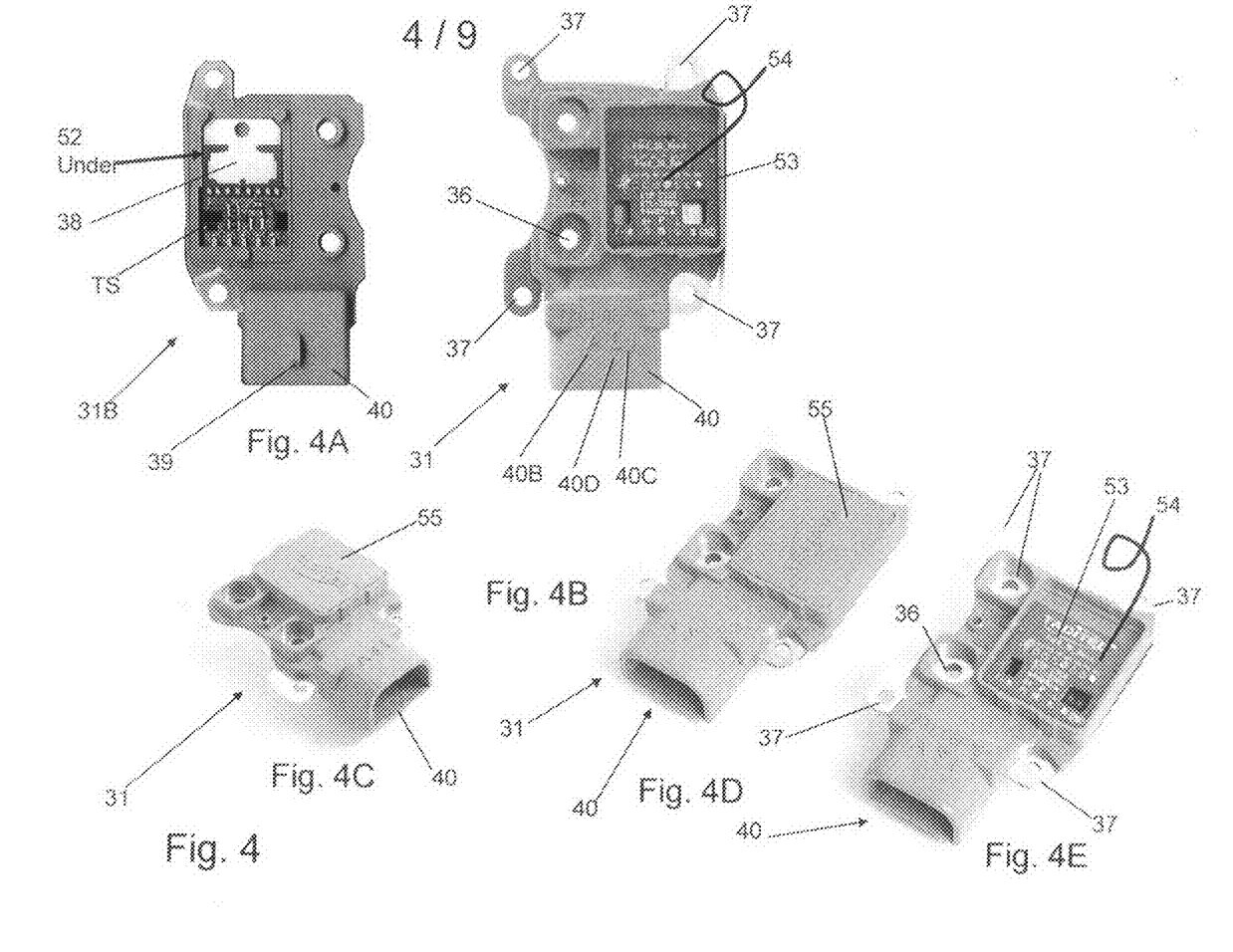
FIGS. 4 are additional views from different vantage points of the Specially Improved Automotive Replacement Voltage Regulator with the various physical attributes and configurations for Specially Improved Automotive Replacement Voltage Regulator.

FIGS. 4A through 4E are views from different vantage points of the Specially Improved Automotive Replacement Voltage Regulator 31 with the various physical attributes and configurations described. FIG. 4A is a bottom view of the Specially Improved Automotive Replacement Voltage Regulator 31 from the heat sink side 31B. It shows the Monolithic chip 52. Here, all control 52A and power 52B devices are combined into one (1) chip (All control functions are made by an MW8 chip) with heat sink 38 attached. The heat sink 38 is generally a metal that is an excellent heat conductor such as aluminum, copper, or the like. It transfers heat away from the chip 52 in order to cool the chip parts, especially the power devices. The heat sink is often exposed to the engine compartment or to a fen within the generator to aid in the cooling. The preferred configuration for the heat sink 38 is a flat plate configuration covering the chip 52. Contiguous or next to the chip 52 and heat sink 38 is the transient suppression TS device. This transient suppression TS feature of the invention anticipates all the types of suppression devices such as, but not limited to, diodes, capacitors, resistors, ferrites, and the plethora of other transient suppressors. In this bottom view one may also see the harness terminal enclosure 40 with it locking protrusion 39 to allow the harness to be removably secured.

In FIG. 4B, the top view shows the circuit board to connect the chip 52 to the transient suppressor TS. The entire cavity is filled after the connections are completed with a passivation material 54 (not shown). This material 54 prevents moisture, dirt, and corrosion from reaching the electronics This top view also shows the various grounds 37 and the F+ terminal 36. The harness connector 40 encloses is insert molded plastic around the terminals 40B, C, and D.

Often, some mechanical means such as the small plastic protrusion shown here affords a means for the connection 39 to be securely but removable attached to the wiring harness (not shown). FIG. 4C shows the cover 55 in place once the passivation material 54 is placed in the cavity. The circuit board cover 55 and edges of the body of the device 31 are ultra sonically welded to make the airtight connection and provide additional protection to the electronics. FIGS. 4C, D and E are isometric views of the Specially Improved Automotive Replacement Voltage Regulator 31 with the components as described above.

Figure 5A:
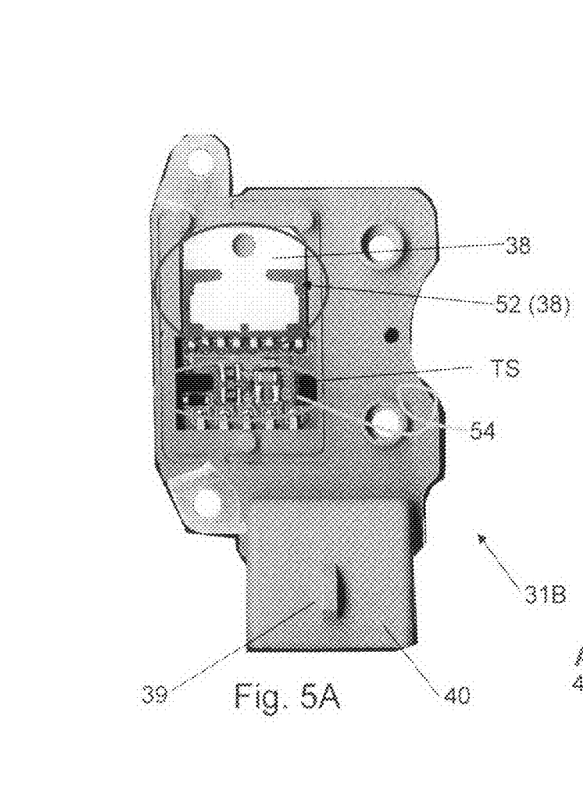
FIGS. 5A and 5B show Top View and Bottom View of the Specially Improved Automotive Replacement Voltage Regulator.
Figure 5B:
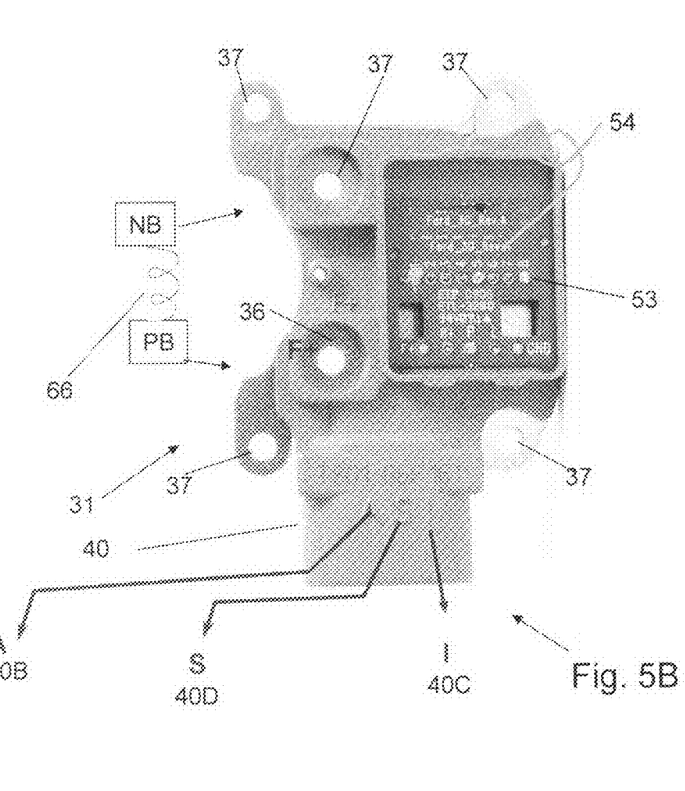

FIGS. 5A and 5B show Top View and Bottom View of the Specially Improved Automotive Replacement Voltage Regulator 31 called Taditel T801 Voltage Regulator for Ford 3G Applications. These views have the same components as just described for FIGS. 4A through 4E. In FIG. 5A, the monolithic chip 52, the heat sink 38 and the transient suppression TS are in an enlarged view. Of special note in FIG. 5B is the High-side-drive 36 connection. This is made by having a fastener inserted through the F+ terminal 36, then engage and connect (by a means 36A) to the positive brush PB. Below. Normally the means is a threaded fastener that also serves to allow the regulator 31 to be removed and/or replaced without dissembling the alternator. Often this may be done while the alternator is still mounted to the engine. The electricity then flows from the regulator 31, through the terminal 36, through the fastener 36A, to the to positive brush PB, through the slip ring, to the rotor field coil 66 through field coil to negative brush to ground 37 and to casting 33.

Figure 6:
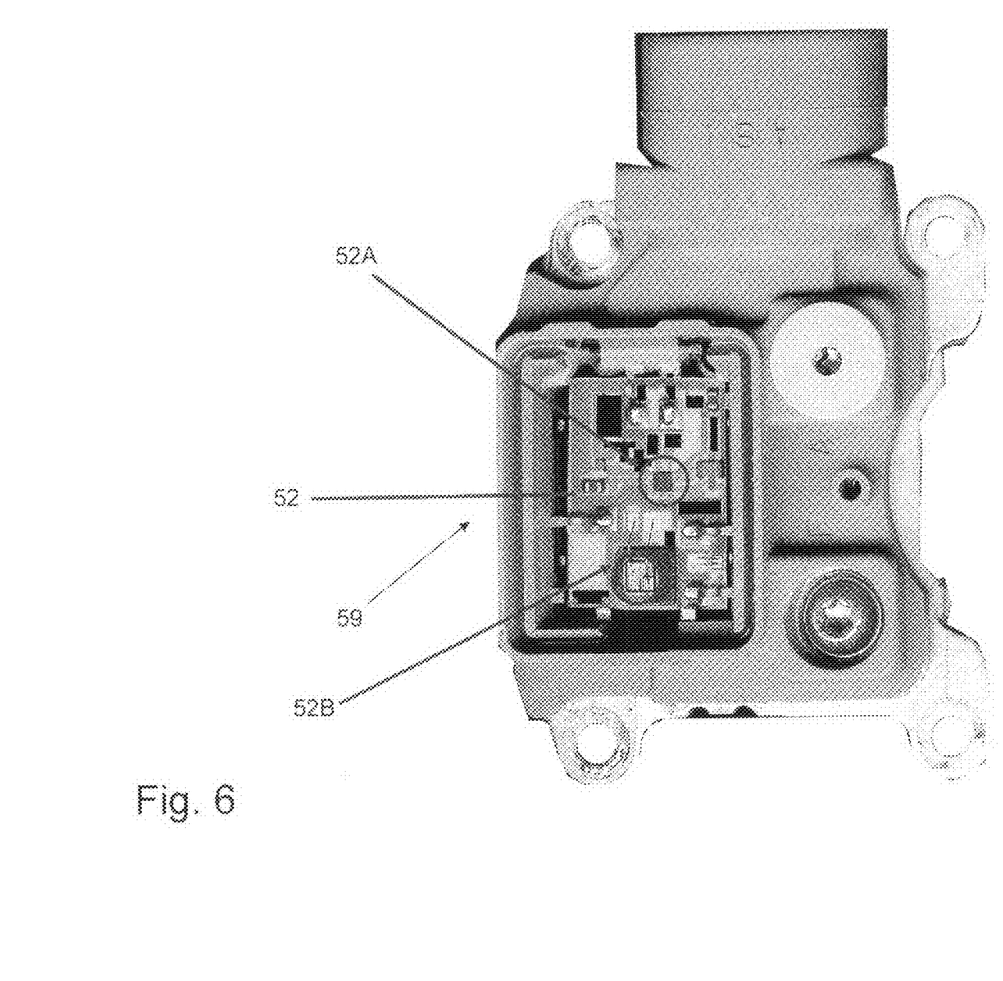
FIG. 6 is a view of the current Original Equipment Voltage regulator for the given vehicle application.

FIG. 6 is a view of the current Original Equipment Voltage regulator 59 for Ford 3G Applications. Several limitations in this design are denoted:
1. Low-Side Drive (B+ connected to positive brush and rotor coil continually).
2. Hybrid circuit with
   a. Separate control chip
   b. Separate field drive
   c. Wire bonded connections The Specially Improved Automotive Replacement Voltage Regulator 31 overcomes all these limitations.

Figures 7A, 7B, 7C:
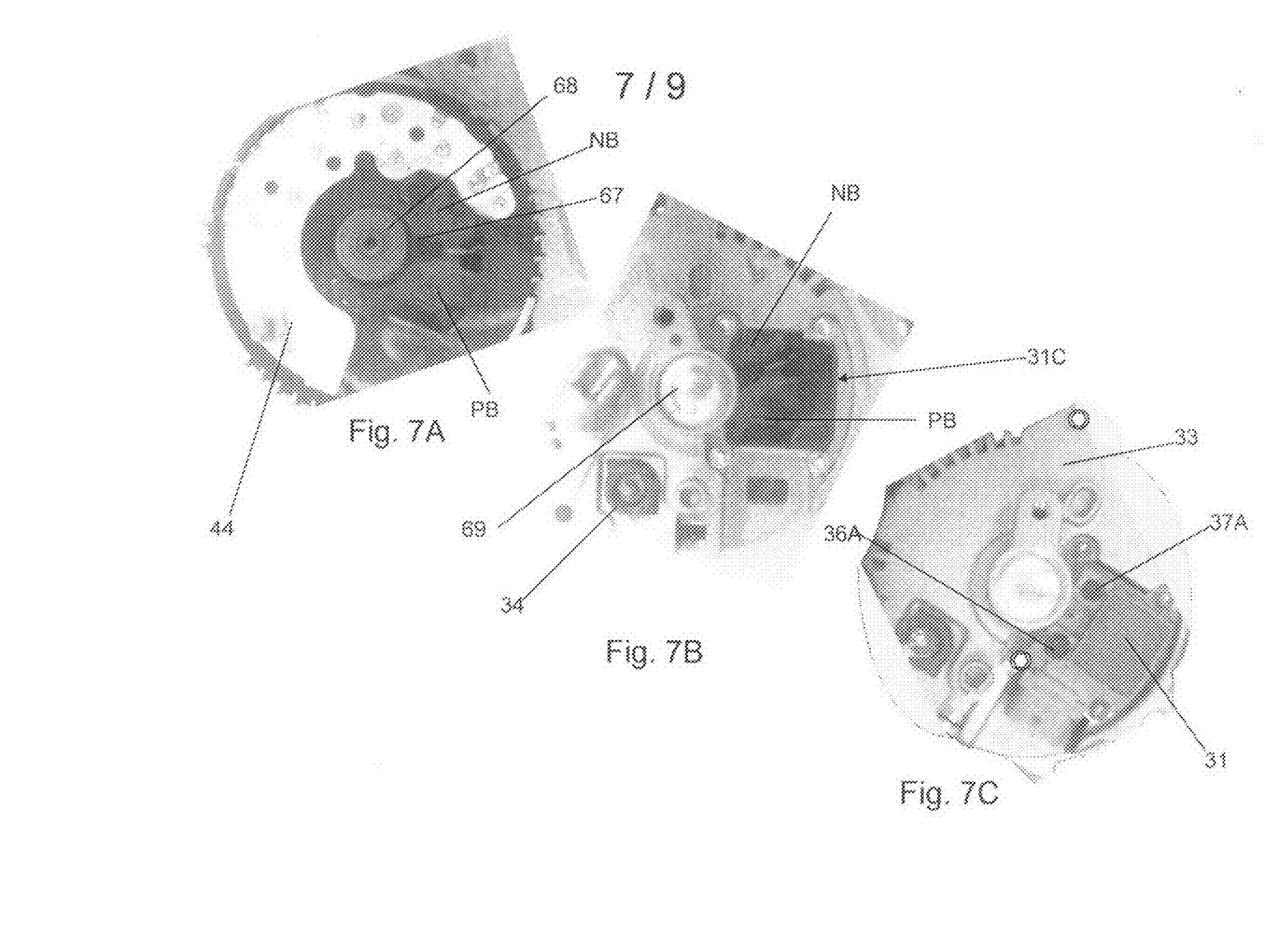
FIGS. 7A through 7C show Top Views of the Specially Improved Automotive Replacement Voltage Regulator in a progressive sequence of connecting the OE regulator to a standard OE rectifier bridge.
Figure 8:
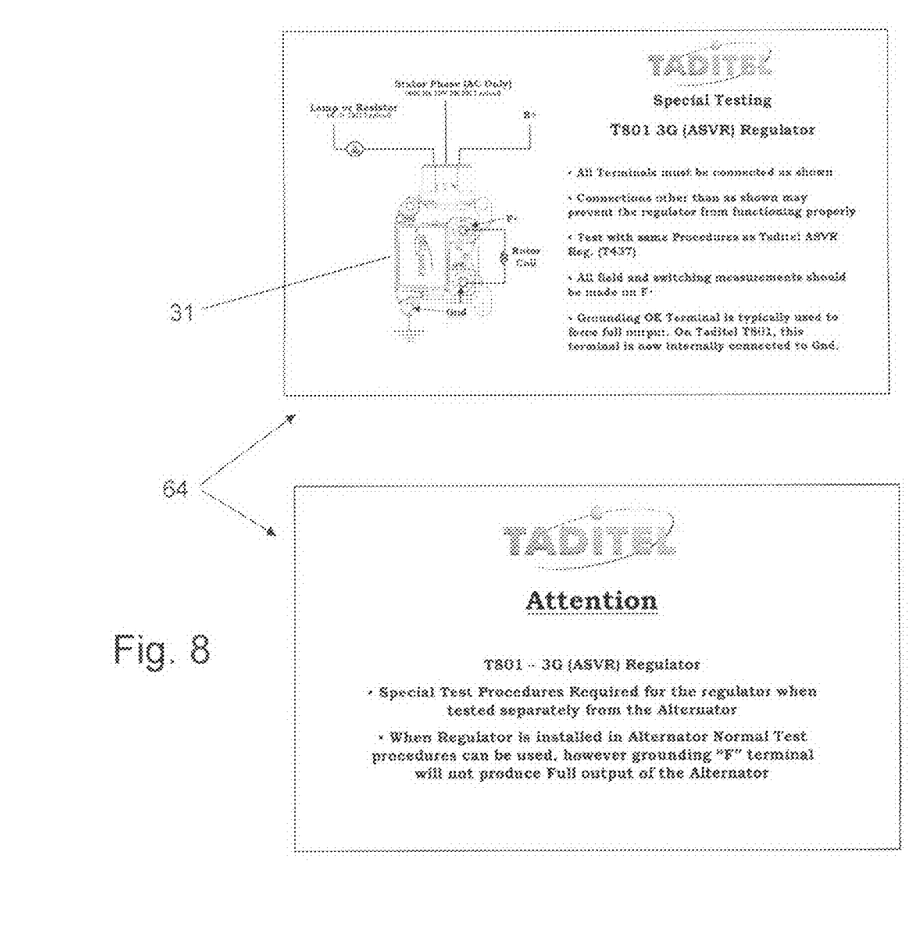
FIG. 8 are engineering and sales details for testing the Specially Improved Automotive Replacement Voltage Regulator.
Figure 9:
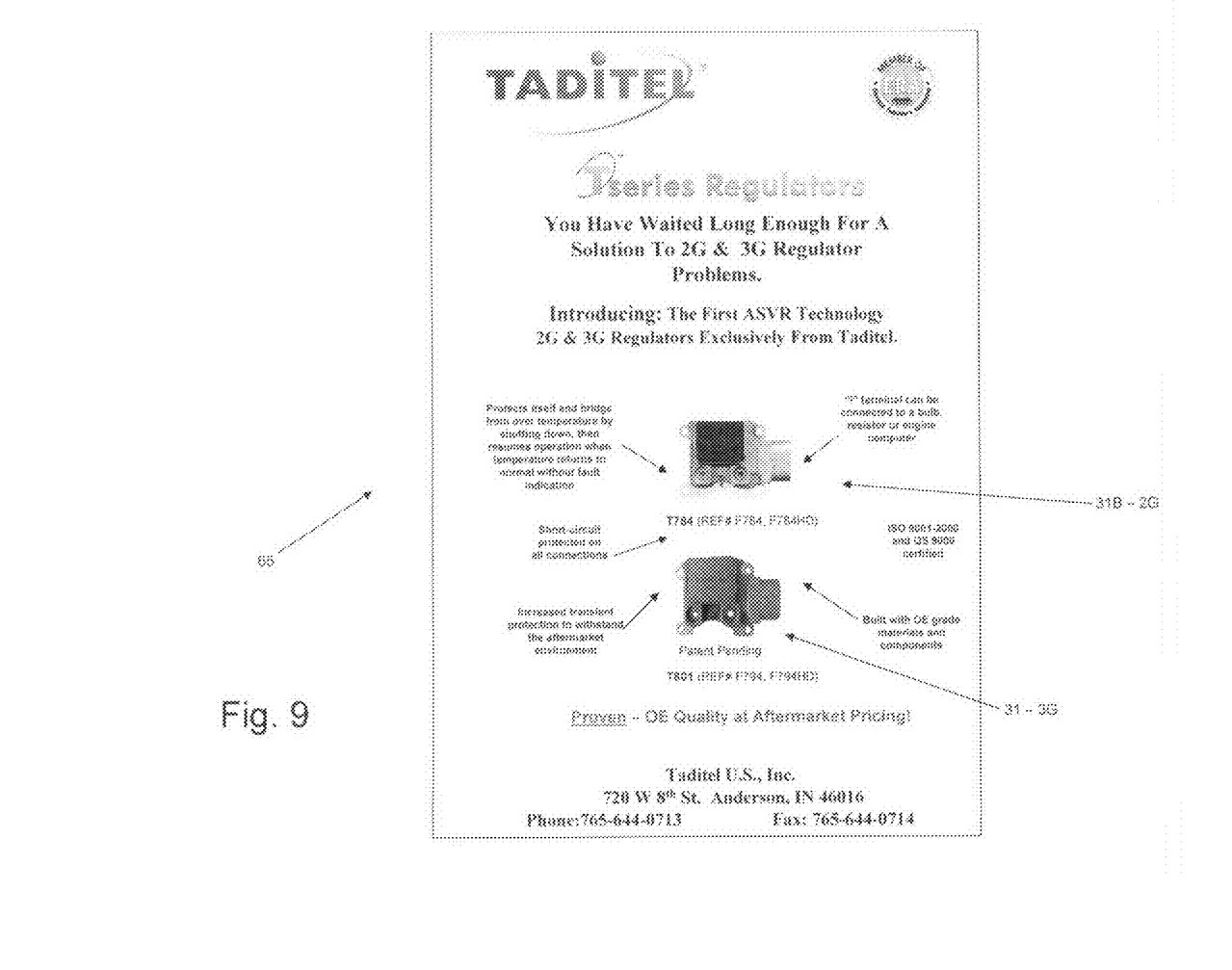
FIG. 9 is an engineering and/or sales bulletin for the Specially Improved Automotive Replacement Voltage Regulator.

FIGS. 7 and 8 are described in the operations below. FIG. 9 is an engineering and/or sales bulletin 65 for the Specially Improved Automotive Replacement Voltage Regulator 31. Shown are the following features in Table B. These quality features are significant and different from most aftermarket regulators as one skilled in the art of automotive electronics may well appreciate.

TABLE B

Features of the Specially Improved Automotive Replacement Voltage Regulator 31

| ITEM | DESCRIPTION |
|---|---|
| 1 | Protects itself and bridge from over temperature by shutting down, then resumes operation when temperature returns to normal without fault indication |
| 2 | Short-circuit protected on all connections |
| 3 | Increased transient protection to withstand the aftermarket environment |
| 4 | Built with OE grade materials and components |
| 5 | ISO 9001-2000 and QS 9000 certified |
| 6 | "I" terminal can be connected to a bulb, resistor or engine computer |

All of the details mentioned here are exemplary and not limiting. Other specific components specific to describing a Improved Automotive All Silicon Voltage Regulator (I-ASVR) 31 may be added as a person having ordinary skill in the field of electronic voltage regulators for alternators devices well appreciates.

Operation of the Preferred Embodiment

The Specially Improved Automotive Replacement Voltage Regulator 31 has been described in the above embodiment. The manner of how the device operates is described below. One skilled in the art of electronic voltage regulators for alternators devices will note that the description above and the operation described here must be taken together to fully illustrate the concept of the Specially Improved Automotive Replacement Voltage Regulator 31.

The preferred embodiment of the Specially Improved Automotive Replacement Voltage Regulator device 31 is comprised essentially of four significant changes to a standard voltage regulator: The first improved change is an addition to the electronics of a transient suppression means TS for the loads 46. The second improved change is the presence of the "high side drive" of the rotor field 66 which eliminates corrosion from the low side short condition. A third change is full passivation 54 around the electronic power and control devices 52 and the transient protection TS. And, a fourth change is utilizing standard, higher volume electronics monolithic chip 52 that contains both the power and control devices and permits a simplified heat sink for thermal dissipation.

FIGS. 7A through 7C show Top Views of the Specially Improved Automotive Replacement Voltage Regulator 31 in a progressive sequence of connecting the OE regulator to a standard OE rectifier bridge. FIG. 7A is a partially built alternator viewed from the slip ring end without the casting 33 or regulator 31. Exposed are the rectifier bridge 44, the slip ring 67 (behind the bearing), the negative brush NB, the positive brush PB (which form the brush holder assembly) and the slip ring end bearing 68. Note the brushes NB and PB encircle and touch/contact the slip ring on two distinct bands. These bands then are each connected to opposite ends of the rotor coil 66 (not visible). As the rotor turns, the electrical connection from the brushes carry electricity from the regulator, through the brush and into the slip ring 67 to excite the field 66. The regulator controls the amount of current, and thus the excitement of the rotor. Since the rotor electromagnetically excites the stator, the ultimate output of the alternator is determined. In FIG. 7B, the casting 33 has been placed and the bearing cover 69. One sees the negative brush NB and the positive brush PB through the aperture 31C in the casting 33. Finally, in FIG. 7C, the Specially Improved Automotive Replacement Voltage Regulator 31 is placed onto the assembly 32 and is connected to the brush NB by fastener 37B and connected to the brush PB through the F+ terminal 36 by fastener 36A. Note the other four corners are connect to the casting 33 by additional fasteners to securely hold the regulator 31 in place.

The Specially Improved Automotive Replacement Voltage Regulator 31 is attached to the alternator by means of the two fasteners 36A and 37A. The alternator is then attached to the engine by the casting 33 and its features and by a drive belt. Finally, a removable harness with various wires is connected to the harness ensure 40 with the A 40B, S 40D, and I 40C pins. The whole electrical diagram is shown in FIG. 3, above. When the engine turns, the drive belt spins the rotor. The field 66 of the rotor is energized by the field current flowing from the regulator through the F+ terminal 36, down through the brush PB, then the slip ring, through the coil 66, back through the slip ring, the other side of the brush NB and through a terminal 37A back to the casting 33 and to ground 37. The regulator controls the current by the control and power devices on the chip 52, described above.

FIG. 8 are engineering and sales details for testing requirements 64 for the Specially Improved Automotive Replacement Voltage Regulator 31. This is contrasted with testing for the Original Equipment units shown in FIG. 6. and contrasted when the regulator is tested as part of the full, complete alternator. These methods shown are incorporated by reference as part of the operation of the regulator 31.

There are many potential uses for this Specially Improved Automotive Replacement Voltage Regulator device 31 for use as electrical voltage control and replacement of 3G and 2G. Features similar to these devices may be used in virtually all alternators for all the various makes and models of vehicles. The physical configuration would need to be adapted for the specific application but the connection principles and transient protection is anticipated by this Specially Improved Automotive Replacement Voltage Regulator device 31. This device may be utilized with the automotive re-manufacturing and original equipment of components that generate electricity for the vehicle. Other applications for stationary power generation may use similar configurations of voltage regulators such as this device affords.

With this description it is to be understood that the Specially Improved Automotive Replacement Voltage Regulator device 31 is not to be limited to only the disclosed embodiment. The features of the Specially Improved Automotive Replacement Voltage Regulator 31 are intended to cover various modifications and equivalent arrangements included within the spirit and scope of the description.

What is claimed is:

1. A regulating device, comprising:
   a means of controlling electrical current;
   a means to connect said control to a rotor field coil of an alternator;
   a means to protect the control means from transient conditions;
   a means to protect the control means from an environmental corrosion;
   a means to connect the device to an engine electrical system harness of wiring;
   a means to package the entire device; and
   a means to removably secure the package to the alternator
   wherein said device is electrically coupled between a high side and ground side of the rotor to provide the rotor current and excite its field.

2. The apparatus according to claim 1 wherein the means to package is the device placed in an insert molded plastic with a plastic cover.

3. The apparatus according to claim 1 wherein the transient protection means is a potted capacitor.

4. The apparatus according to claim 3 wherein the capacitor is a discrete electrical component.

5. The apparatus according to claim 3 wherein the capacitor is built into the integrated circuitry of the voltage regulator.

6. The apparatus according to claim 1 wherein the means to controlling electrical current is a monolithic chip that contains both the power and control devices and the chip is configured to secure to a simplified heat sink for thermal dissipation.

7. The apparatus according to claim 6 wherein the heat sink is metal.

8. The apparatus according to claim 7 wherein the metal is copper.

9. The apparatus according to claim 7 wherein the metal is aluminum.

10. The apparatus according to claim 1 wherein the means to means to protect the control means from an environmental corrosion is a passivation material placed the chip in an insert molded plastic with a plastic cover.

11. The apparatus according to claim 10 wherein the passivation is a non-conductor silicon gel.

\* \* \* \* \*